United States Patent [19]
Ishii et al.

[11] Patent Number: 5,566,010
[45] Date of Patent: Oct. 15, 1996

[54] LIQUID CRYSTAL DISPLAY WITH SEVERAL CAPACITORS FOR HOLDING INFORMATION AT EACH PIXEL

[75] Inventors: Yutaka Ishii, Nara; Yoshitaka Yamamoto, Yamatokoriyama; Terutoshi Tsuchihira, Ashiya, all of Japan

[73] Assignee: Sharp Kabushiki Kaisha, Osaka, Japan

[21] Appl. No.: 222,162

[22] Filed: Apr. 4, 1994

Related U.S. Application Data

[63] Continuation of Ser. No. 866,637, Apr. 10, 1992, abandoned.

[30] Foreign Application Priority Data

Apr. 10, 1991 [JP] Japan ................................. 3-077983

[51] Int. Cl.$^6$ ............................ G02F 1/133; G02F 1/1343
[52] U.S. Cl. ............................ 359/59; 359/53; 345/186; 345/196; 345/88; 345/58
[58] Field of Search ...................... 359/68, 100, 98, 359/53, 70, 93, 85, 57, 59, 55, 58; 340/784; 345/98, 100, 186, 196, 88, 90, 93, 101

[56] References Cited

U.S. PATENT DOCUMENTS

| | | | |
|---|---|---|---|
| 3,703,329 | 11/1972 | Castellano | 359/53 |
| 4,090,219 | 5/1978 | Ernstoff et al. | 359/48 |
| 4,416,514 | 11/1983 | Plummer | 359/53 |
| 4,838,655 | 6/1989 | Hunahata et al. | 359/98 |
| 4,842,379 | 6/1989 | Oishi et al. | 359/53 |
| 4,843,381 | 6/1989 | Baron | 340/784 |
| 4,886,343 | 12/1989 | Johnson | 359/53 |
| 5,032,007 | 7/1991 | Silverstein et al. | 359/53 |
| 5,128,782 | 7/1992 | Wood | 359/85 |
| 5,132,826 | 7/1992 | Johnson et al. | 359/93 |
| 5,225,823 | 7/1993 | Kanaly | 345/89 |

FOREIGN PATENT DOCUMENTS

| | | |
|---|---|---|
| 0298255 | 1/1989 | European Pat. Off. . |
| 0336351 | 10/1989 | European Pat. Off. . |
| 0437328A2 | 7/1991 | European Pat. Off. . |
| 73.08089 | 3/1973 | France . |
| WO91/03003 | 3/1991 | WIPO . |

OTHER PUBLICATIONS

Matsummoto, "Electronic Display Devices", John Wiley & Sons, 1990, pp. 29–85.
Kaneko, "Liquid Crystal TV Displays", KTK Scientific Publishing, 1987.
T. Uchida et al., Reflective Multicolor Liquid Crystal Display — Television Learned Society, vol. 40, No. 10 (1986).

*Primary Examiner*—William L. Sikes
*Assistant Examiner*—Kenneth Parker
*Attorney, Agent, or Firm*—David G. Conlin; George W. Neuner; Brian L. Michaelis

[57] ABSTRACT

It is an object of the invention to present a liquid crystal display device capable of displaying high precisely and brightly. The incident light into the reflection type liquid crystal display element is selectively varied by using the light selecting means, that is, cyan filter, magenta filter, and yellow filter, and red light, green light, and blue light are entered in every unit time. By controlling the reflection/cutoff of color lights of these three primary color by the reflection type liquid crystal display element, multicolor display of eight colors or full-color display is realized.

22 Claims, 5 Drawing Sheets

LIQUID CRYSTAL DISPLAY WITH SEVERAL CAPACITORS FOR HOLDING INFORMATION AT EACH PIXEL

This is a continuation of application Ser. No. 07/866,637 filed on Apr. 10, 1992 now abandoned.

BACKGROUND OF THE INVENTION

1. Field of the Invention

The present invention relates to a liquid crystal display device, and more particularly to a reflection type liquid crystal display device preferably used in office automation appliances such as word processor and notebook type personal computer, various video appliances, and game appliances.

2. Description of the Related Art

The liquid crystal display device is used presently in wide fields including clock, pocket calculator, computer terminal, word processor and TV set. The representative display mode used in such applications is the so-called TN (twisted nematic mode) which twists the liquid crystal molecules in the liquid crystal display element nearly by 90 degrees as the initial orientation.

The TN mode is intended to display monochromatically by disposing liquid crystal display elements between a set of polarizers and by making use of the optical properties of the liquid crystal elements, that is, the optical rotatory characteristic when voltage is not applied, and the canceling optical rotatory characteristic when voltage is applied.

For color display, color filters of, for example, red, blue and green are disposed in the liquid crystal display elements, and by making use of the light switching properties in the TN mode, multi-color display or full-color display is realized by additive color mixture. This color display method is presently used in the display of a portable so-called pocket liquid crystal display television applying the active matrix drive or simple matrix drive.

The display mode widely used in the display for word processor is the STN (super twisted nematic mode) having the liquid crystal display element structure similar to that of the TN mode, in which the twisting angle of liquid crystal molecules is set at 180 to 270 degrees. It is the feature of the STN mode that an electro-optical characteristic possessing a sharp threshold value is realized by reflecting the sudden molecular orientation deformation due to increase of applied voltage in the double refraction (birefringence) change of liquid crystal by the increase of twisting angle of liquid crystal molecules over 90 degrees and optimization of the polarizer setting angle. It is therefore suited to simple matrix drive.

On the other hand, in this STN mode, the background color of the display is tinted with yellow-green or dark blue color due to double refraction of liquid crystal. As an improvement, it is proposed to use a liquid crystal display element capable of displaying monochromatically by compensating the colors by laminating the STN panel for display with an optical compensating panel or phase differential plate formed of high molecules of polycarbonate or the like. At the present, this liquid crystal display element structure is available on market in the name of paper white LCD. As the color display in STN mode, multicolor display or full-color display is realized in the same principle of operation as in the TN mode.

Besides, where a wide viewing angle is required, the so-called GH (guest-host) mode Is used, in which pigments differing in the light absorbance in the major axis (molecule axis) direction and minor axis direction (dichroic pigment) are added to liquid crystal molecules. The GH mode is classified into the Heilmeier type using polarizer, White-Taylor type (phase transition type) not using polarizer, and two-layer type, and regardless of the type the principle of operation is to control the orientation of the pigments through orientation of the liquid crystal molecules by voltage and display by making use of the difference in light absorbance in the pigment molecule direction. The color display is realized by using pigments that absorb the wavelength of a part of visible light, or combining the GH mode liquid crystal display element using black pigment with colored filters. The details of principle of operation of the TN mode, STN mode and GH mode are described in "Liquid Crystal Device Handbook" (edited by Committee 142 of Japan Society of Scientific Promotion, pp. 315–346, 1989).

In the display mode using polarizers, the light utility rate is decreased at least to less than 50% depending on the optical properties of the polarizers. Therefore, in order to realize a, so to speak, bright display demanded in the reflection type display or projection type display, the display mode without polarizer is advantageous. From this point of view, possible candidates among the known display modes are the White-Taylor type (phase transition type) GH mode and two-layer type GH mode.

Comparing these two display modes, it is already reported that the two-layer type GH mode is superior in the contrast and brightness (Proc. of the SID. 2514, 1984, p. 275). In the liquid crystal display element of the conventional two-layer type GH mode, however, since an ordinary glass substrate is used between liquid crystal layers, parallax is caused between the upper and lower liquid crystal layers depending on the viewing angle, and the display is blurry.

As its improving measure, it may be considered to use a very thin glass sheet between the liquid crystal layers, but it is difficult in handling and difficult to control the thickness of the liquid crystal display elements. It is therefore not applicable to the display of high precision in a relatively wide area.

Concerning the problem of parallax, the White-Taylor type GH mode is advantageous because it is composed of one layer, but its display precision is inferior as stated above, and in the case of multicolor display, in particular, since the microcolor filter is needed, the brightness is lost, and the display precision is inferior.

SUMMARY OF THE INVENTION

It is hence a primary object of the invention to present a liquid crystal display device capable of solving the above problems and providing a high precision and bright display.

To achieve the above object, the invention presents a liquid crystal display device comprising a liquid crystal display element composed of electrodes formed on the confronting surfaces of a transparent substrate and a substrate having light reflecting means for reflecting the incident light from the transparent substrate side, using the electrode overlapped regions display region, and placing an interposing liquid crystal between the transparent substrate and the substrate, and light selecting means disposed at the transparent substrate side for varying the wavelength of the incident light in the liquid crystal display element in every predetermined unit time.

In the invention, the light selecting means comprises:

a cyan filter forming transparent electrodes nearly over the entire area of the confronting surfaces of a pair of transparent substrates, and placing an interposing liquid crystal containing dichroic pigment of cyan between the pair of transparent substrates, a magenta filter forming transparent electrodes nearly over the entire area of the confronting surfaces of a pair of transparent substrates, and placing an interposing liquid crystal containing dichroic pigment of magenta between the pair of transparent substrates, a yellow filter forming transparent electrodes nearly over the entire area of the confronting surfaces of a pair of transparent substrates, and placing an interposing liquid crystal containing dichroic pigment of yellow between the pair of transparent substrates, and filter driving means for applying a voltage selectively to the transparent electrodes of cyan filter, magenta filter and yellow filter.

According to the invention, the incident light differing in the wavelength in every predetermined unit time, that is, the light having specific color, is entered in the liquid crystal display element by the light selecting means. In the liquid crystal display element, for example, when no voltage is applied to the electrode, the incident light is cut off, and when voltage is applied to the electrode, the incident light is reflected by the light reflecting means, and by so setting the monochromatic display in the display region, the so-called normally black mode is realized. In this liquid crystal display element, since a specific color is entered by the light selecting means as mentioned above, in the ON state in which the display region is a white display, this display region is display in a color by the specific color light. For example, when a blue light enters, a blue display is made, and when a red light enters, a red display is made. If halftone display is possible in the liquid crystal display element, for example, in the blue display, different tones of blue, ranging from pale blue to dark blue, may be displayed.

Furthermore, by varying the color of incident light in every predetermined unit time, a combination of plural colors may be also displayed. That is, by combination of three primary color of red, green and blue colors, further different colors may be displayed. At this time, in the case of liquid crystal display element for on/off display, a multicolor display of eight colors consisting of red, green, blue, yellow, magenta, cyan, white, and black is realized, and in the case of liquid crystal display element with halftone display, a full-color display is realized.

Also in the invention, the light selecting means is composed by laminating a cyan filter for passing cyan light only, a magenta filter for passing magenta light only, and a yellow filter for passing yellow light only, and the transmission of color light of each filter is controlled by filter driving means. The cyan filter is composed of a liquid crystal containing a dichroic pigment presenting a cyan color. This dichroic pigment differs the light absorbance between the major axis (molecule axis) direction of its molecule and the minor axis direction. Therefore, by controlling the orientation state of the pigment molecules by the change of the orientation state of the liquid crystal molecules by the application of voltage, the cyan filter is set selectively in the cyan colored state for passing only cyan light and the colorless state for passing the incident light (white light) directly. The other magenta filter and yellow filter are composed same as the cyan filter and hence operate similarly.

The filter driving means applies a voltage selectively to the transparent electrodes of the cyan filter, magenta filter and yellow filter. By setting so that the liquid crystals of the filters may be colored when no voltage is applied, the black display, that is, all incident light is cut off in the no-voltage state according to the principle of subtractive color mixture. By applying a voltage to a desired filter, the color of the incident light of the liquid crystal display element may be selected in one desired color out of the eight colors.

Thus, according to the invention, since a specific color light is entered in the liquid crystal display element by the light selecting means, in the ON state in which the display region is a while display, the color of the specific color light is displayed in that display region. For example, when a blue light enters, a blue display appears, and when a red light enters, a red display appears.

In the case where the liquid crystal display element is constructed for halftone display, for example, a blue display is made at different tones, from pale blue to dark blue.

Furthermore, by varying the color of incident light in every predetermined unit time, plural colors may be combined and displayed. That is, by the combination of three primary color of red, green and blue, further different colors may be displayed. In the case of liquid crystal display element of on/off display, a multicolor display of eight colors consisting of red, green, blue, yellow, magenta, cyan, white, and black is realized, and in the liquid crystal display element for halftone display, a full-color display is realized.

Also in the invention, the filter driving means sequentially drives the cyan filter, magenta filter and yellow filter in every predetermined unit time, forms a red display period in which the incident light to the liquid crystal display element is red, a green display period in which it is green, and a blue display period in which it is blue, and sets the unit display period by the red display period, green display period, and blue display period.

Also in the invention, the liquid crystal display element is driven by the liquid crystal driving means for driving individually the quantity of reflected light in each display region, in every display period of red, green and blue for composing the unit display period.

Also in the invention, the liquid crystal driving means sets the quantity of reflected light in each display region either at 0 or at a predetermined value.

Also in the invention, the liquid crystal driving means changes the quantity of reflected light in each display region continuously or stepwise between 0 and a predetermined value.

Also in the invention, the liquid crystal display element is an active matrix type liquid crystal display element forming one common electrode nearly over the entire surface of the transparent substrate, and forming plural display electrodes for forming display regions on the confronting substrate.

Also in the invention, the liquid crystal driving means is controlled by display control means for producing a scanning signal for specifying the plural display electrodes individually, and a driving signal for applying a voltage to each display electrode.

Also in a preferred embodiment of the invention, the liquid crystal driving means comprises plural unit driving parts corresponding to the plural display electrodes individually, and the unit driving part comprises a signal scanning part controlled on/off by the scanning signal for producing the driving signal in ON state, a buffer circuit for applying a voltage to the display electrode according to the driving signal from the signal scanning part, and a signal holding capacitor disposed between the signal scanning part and buffer circuit for holding the potential of the driving signal from the signal scanning part.

Also in another preferred embodiment of the invention, the liquid crystal driving means comprises plural unit driving parts corresponding to the plural display electrodes individually, and the unit driving part comprises a signal scanning part controlled on/off by the scanning signal for producing the driving signal in ON state, a buffer circuit for applying a voltage to the display electrode according to the driving signal from the signal scanning part, two signal holding capacitors disposed between the signal scanning part and buffer circuit for holding the potential of the driving signal from the signal scanning part, and connection changeover means for connecting the second capacitor to the buffer circuit when connecting the first capacitor of the two signal holding capacitors to the signal scanning part, and connecting the first capacitor to the buffer circuit when connecting the second capacitor to the signal scanning part.

BRIEF DESCRIPTION OF THE DRAWINGS

Other and further objects, features, and advantages of the invention will be more explicit from the following detailed description taken with reference to the drawings wherein:

FIG. 5 is a circuit diagram showing the composition of other driving circuit 4a.

DETAILED DESCRIPTION OF THE PREFERRED EMBODIMENTS

Figure 1:
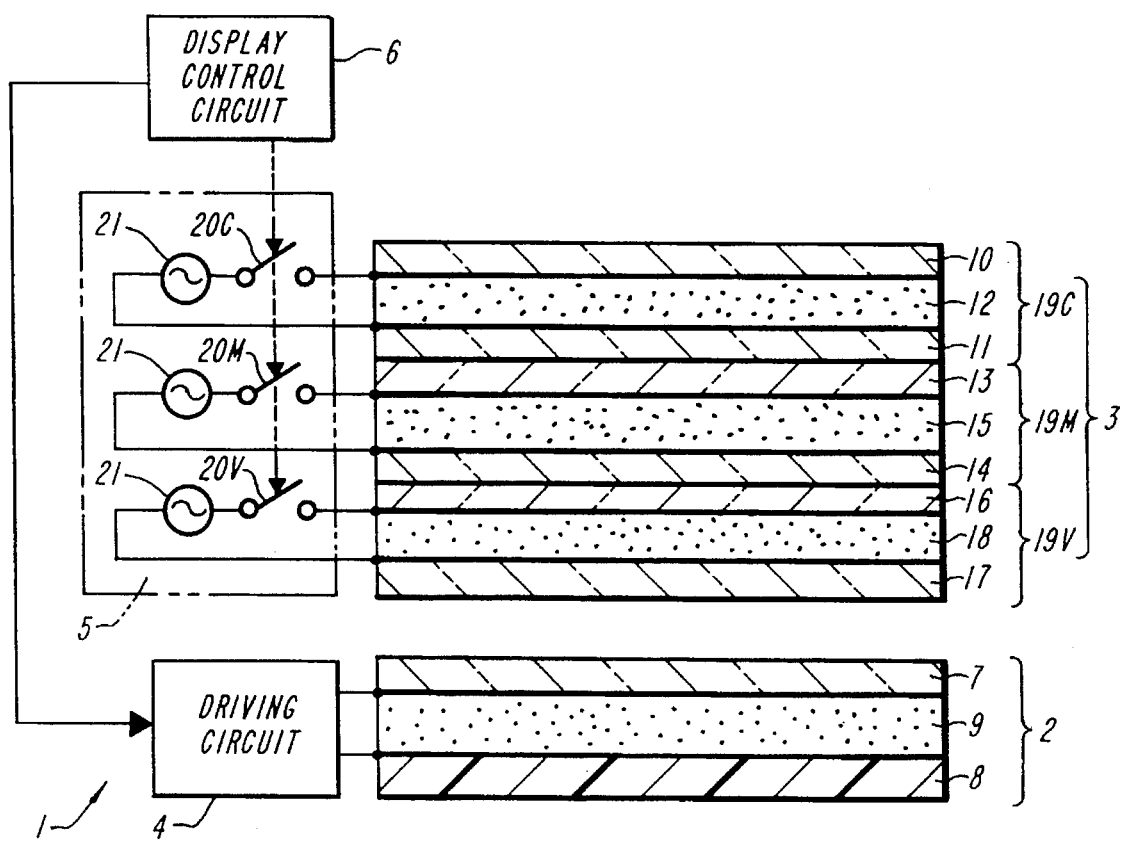
FIG. 1 is a diagram showing a basic composition of a liquid crystal display device 1 in an embodiment of the invention.

Now referring to the drawing, preferred embodiments of the invention are described below.

The invention is intended to realize multicolor display or full-color display by placing a color variable filter variable in wavelength of transmitted light by voltage applying means on a reflection type liquid crystal display element for monochromatic display, and varying the display pattern of the reflection type liquid crystal display element in synchronism with the color change of the filter. More specifically, the color variable filter, if the one capable of transmitting and varying the wavelength of the light corresponding to, for example, red, blue and green depending on the state of voltage application is selected, by changing the display pattern of the liquid crystal display element by matching the timing with the transmission change of the color variable filter, a desired color display is realized. In the case of liquid crystal display element for halftone display, a full-color display is realized, and in the case of monochromatic display, an eight-color display is realized.

FIG. 1 schematically shows the construction of a liquid crystal display device 1 in an embodiment of the invention. The liquid crystal display device 1 comprises a reflection type liquid crystal display element 2, light selecting means 3 laminated on the reflection type liquid crystal display element 2, a driving circuit 4 for driving the reflection type liquid crystal display element, 2, a filter driving circuit 5 for driving the light selecting means 3, and a display control circuit 6 for controlling the driving circuit 4 and filter driving circuit 5 for showing a desired display in a desired color in the liquid crystal display device 1.

The reflection type liquid crystal display element 2 is an active matrix type liquid crystal display element, consisting of a transparent substrate 7, a confronting substrate 8 having light reflecting means for reflecting the incident light from the transparent substrate 7 side, and a liquid crystal 9 interposing between the transparent substrate 7 and the substrate 8. Nearly on the entire surface of the transparent substrate 7 confronting the substrate 8, a common electrode is formed, and on the surface of the substrate 8 confronting the transparent substrate 7, plural display electrodes are formed in matrix, and the overlapping region of the electrodes is the display region (pixel). The reflection type liquid crystal display element 2 displays as specified as the driving voltage is applied between the common electrode and display electrode from the driving circuit 4. The driving circuit 4 is controlled by the display control signal from the display control circuit 6.

The light selecting means 3 is composed of a cyan filter 19C, a magenta filter 19M, and a yellow filter 19Y laminated in this sequence, and is disposed at the transparent substrate 7 side of the reflection type liquid crystal display element 2. The cyan filter 19C forms transparent electrodes not shown on the entire area of the confronting surfaces of a pair of transparent substrates 10, 11, and a liquid crystal 12 containing dichroic pigment (dichroism dye) of cyan mentioned later is interposing between the substrates 10, 11. The magenta filter 19M forms transparent electrodes not shown on the entire area of the confronting surfaces of a pair of transparent substrates 13, 14, and a liquid crystal 15 containing dichroic pigment of magenta mentioned later is interposing between the substrates 13. 14. The yellow filter 19Y forms transparent electrodes not shown on the entire area of the confronting surfaces of a pair of transparent substrate 16, 17, and a liquid crystal 18 containing dichroic pigment of yellow mentioned later is interposing between the substrates 16, 17.

The cyan filter 19C, magenta filter 19M, and yellow filter 19Y are supplied with an AC voltage from an AC power source 21 through switching circuits 20C, 20M, 20Y, respectively. The switching circuits 20C, 20M, 20Y selectively apply AC voltages to the cyan filter 19C, magenta filter 19M, and yellow filter 19Y according to the changeover signal from the display control circuit 6, and drive the filters. By such on/off control of the filters, the three primary color of red light, green light and blue light enter the reflection type liquid crystal display element 2. Table 1 shows the correspondence of drive state of each filter and color of incident light.

TABLE 1

| Drive state | | | Color of incident |
|---|---|---|---|
| 19C | 19M | 19Y | light |
| ON | OFF | OFF | Red |
| OFF | ON | OFF | Green |
| OFF | OFF | ON | Blue |

Figure 2:
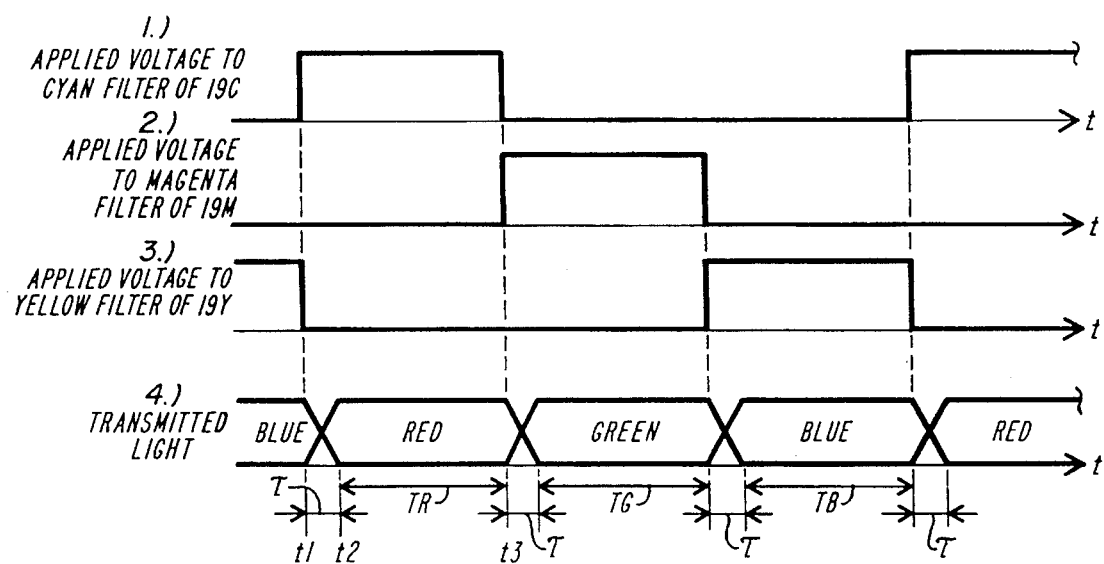
FIG. 2 is a timing chart for explaining the driving method of light selecting means 3 of the liquid crystal display device 1.

FIG. 2 is a timing chart showing the basic operation of the light selecting means 3. In the period from time t1 to time t3, a voltage is applied to the cyan filter 19C. The liquid crystal molecules are not immediately changed in the orientation state when a voltage is applied, but it requires a certain transition period τ. This period τ corresponds to the response recovery speed of the liquid crystal molecule to the electric field. Therefore, when voltage application begins at time t1, it is time t2 after passing of the transition period τ that the state of orientation of the cyan filter 19C is actually changed and stabilized in response to the voltage. Therefore, in the period TR from time t2 to time t3, the transmitted light of the light selecting means 3 is a red light. Similarly, thereafter, in the sequence of the magenta filter 19M, yellow filter 19Y, cyan filter 19C, ..., the application of voltage to the filters is repeated. Hence, in the period TG, the transmitted light is a green light, and in the period TB, the transmitted light is a blue light, and thereafter the red light, green light, blue light, red light and so forth are repeated.

Figure 3:
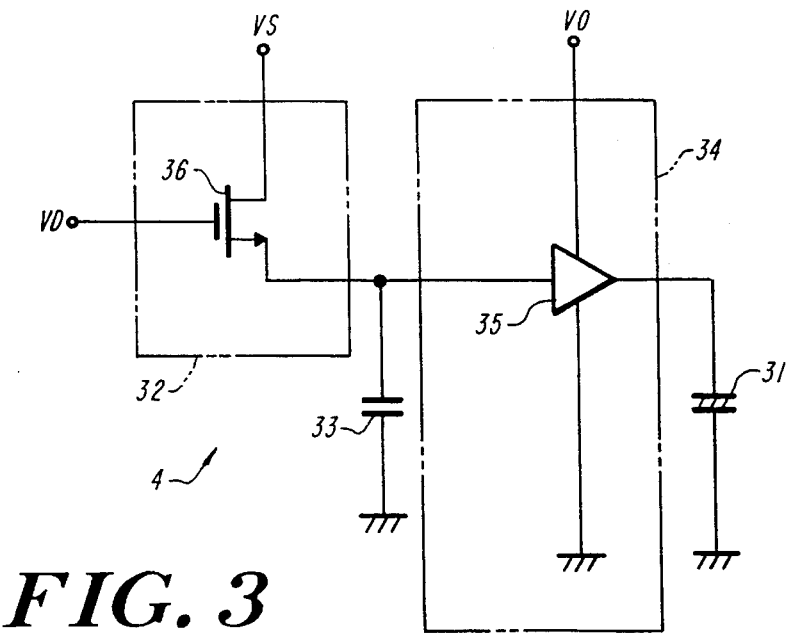
FIG. 3 is a circuit diagram showing a basic configuration of a driving circuit 4.

FIG. 3 is a circuit diagram showing the basic composition of the driving circuit 4. In FIG. 3, a capacitor 31 represents a liquid crystal of one display region (one pixel) in the reflection type liquid crystal display element 2. The driving circuit 4 comprises a signal scanning part 32, a signal holding capacitor 33, and a pixel driving part 34. The signal scanning part 32 is an N-channel MOS transistor 36, and a scanning signal VD from the display control circuit 6 is given to the gate, and a driving signal VS is given to the source, and the drain is connected to the signal holding capacitor 33 and a buffer circuit 35 which is the pixel driving part 34. In the buffer circuit 35, a liquid crystal driving voltage VO is supplied, and the output voltage from the buffer circuit 35 is applied to the liquid crystal 31.

When a scanning signal VD of high level is applied to the gate of the transistor 36, the transistor 36 is turned on, and a driving signal VS is applied to the liquid crystal 31 through the buffer circuit 35. The driving signal VS is also given to the signal holding capacitor 33, and in the period until the next scanning signal VD is given to the gate of the transistor 36, the driving signal VS is held by the signal holding capacitor 33.

On the other hand, in the active matrix type reflection type liquid crystal display element 2, supposing the number of scanning electrodes (number of gate electrodes) to be N and the number of signal electrodes (number of source electrodes) to be M, the following two driving methods are proposed.

Figure 4:
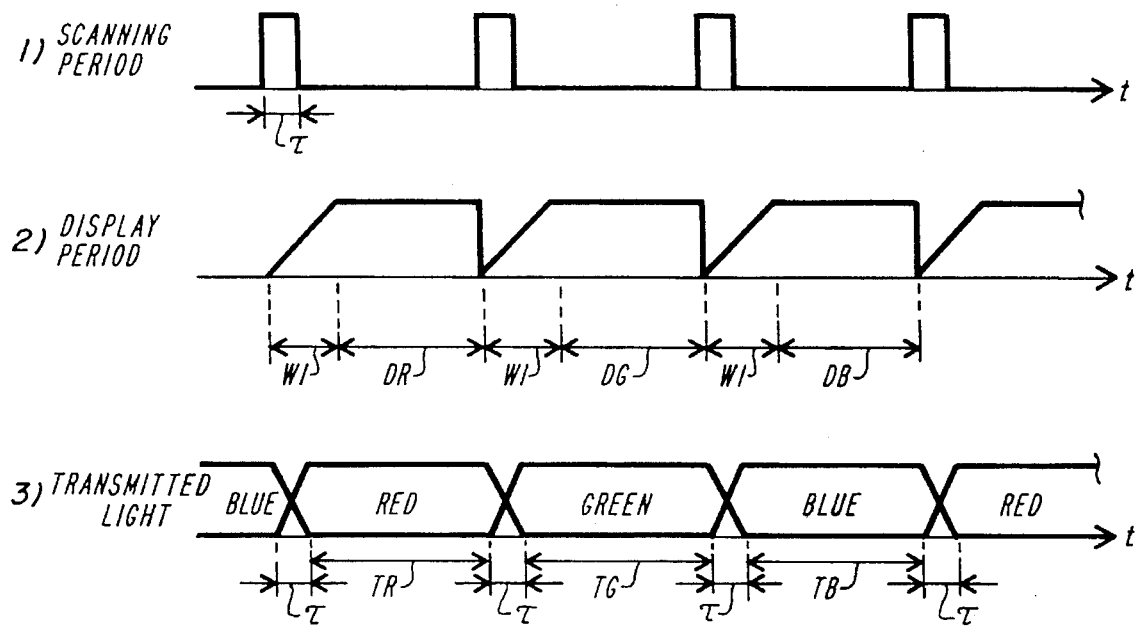
FIG. 4 is a timing chart for explaining a first driving method of the liquid crystal display device 1.

FIG. 4 is a timing chart for explaining the first driving method. In the first driving method, N scanning electrodes are scanning in a very short time as compared with the period of period τ+ period TR (TG, TB), and a desired electric charge is injected in N×M pixels, and the display is made by adjusting the timing nearly with the periods TR, TG, TB.

As shown in FIG. 4(1), first in period τ, all of N scanning electrodes of the reflection type liquid crystal display element 2 are scanned, and an electric charge is sequentially injected in N×M pixels. From the starting moment of the scanning period τ, a desired driving signal is applied to the signal electrodes, and a specified voltage is applied to the liquid crystal.

The liquid crystal molecules, as mentioned above, require a certain transient period from the orientation state with no voltage applied until the orientation state is changed and stabilized when voltage is applied. Therefore, as shown in FIG. 4(2), it requires the period of W1 until the reflection type liquid crystal display element 2 reaches a stable display state. The period W1 is the sum of the period τ and the response time of the display mode applied to the reflection type liquid crystal display element 2.

Therefore, in the display periods DR, DG, DB, ... from the time after lapse of the period W1 from the starting moment of the scanning period of the liquid crystal display element 2 till the starting period of the next scanning period, three colors of red, green and blue are displayed sequentially. Hence, by selecting the transmitted light in every pixel, a multicolor display of eight colors is possible by the principle of additive color mixture. In the liquid crystal display element 2, if halftone display is possible, a full-color display is realized.

In FIG. 4, meanwhile, as the period for scanning all of N scanning electrodes, the transition period τ in the light selecting means 3 is selected, but it may not be limited to the period τ, but the scanning period τ is desired to be as short as possible in order to obtain a sharp color and a bright display. In the scanning period τ, meanwhile, light leak of mixture of two of three colors occurs, and therefore in the period τ, the display of the liquid crystal display element 2 may be black, and the desired display patterns may be scanned in the periods, TR, TG, TB. In this case, too, in order to obtain a brighter display, the transition period τ and the scanning period τ should be as short as possible. In FIG. 4, furthermore, the period W1 is the sum of the scanning period r and the response time of the display mode applied to the liquid crystal display clement 2, and for the purpose of shortening the period W1, the response speed of the display mode should be also fast, together with the scanning period τ.

Figure 5:
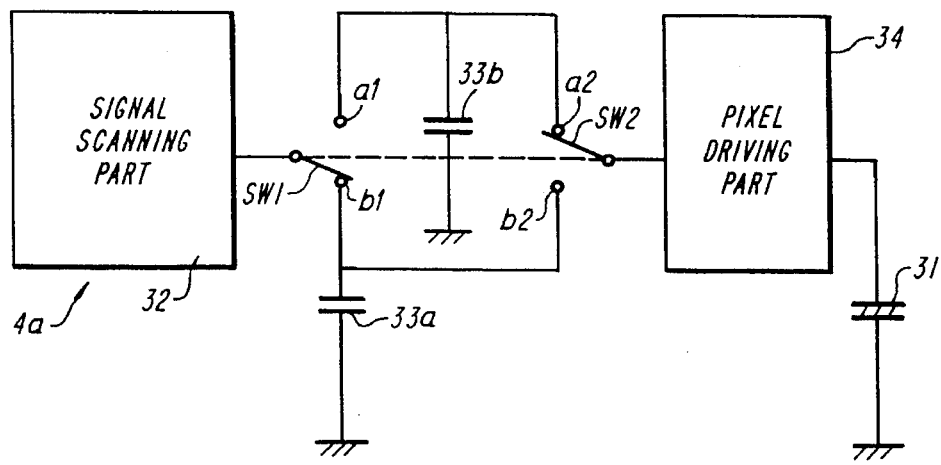
Figure 6:
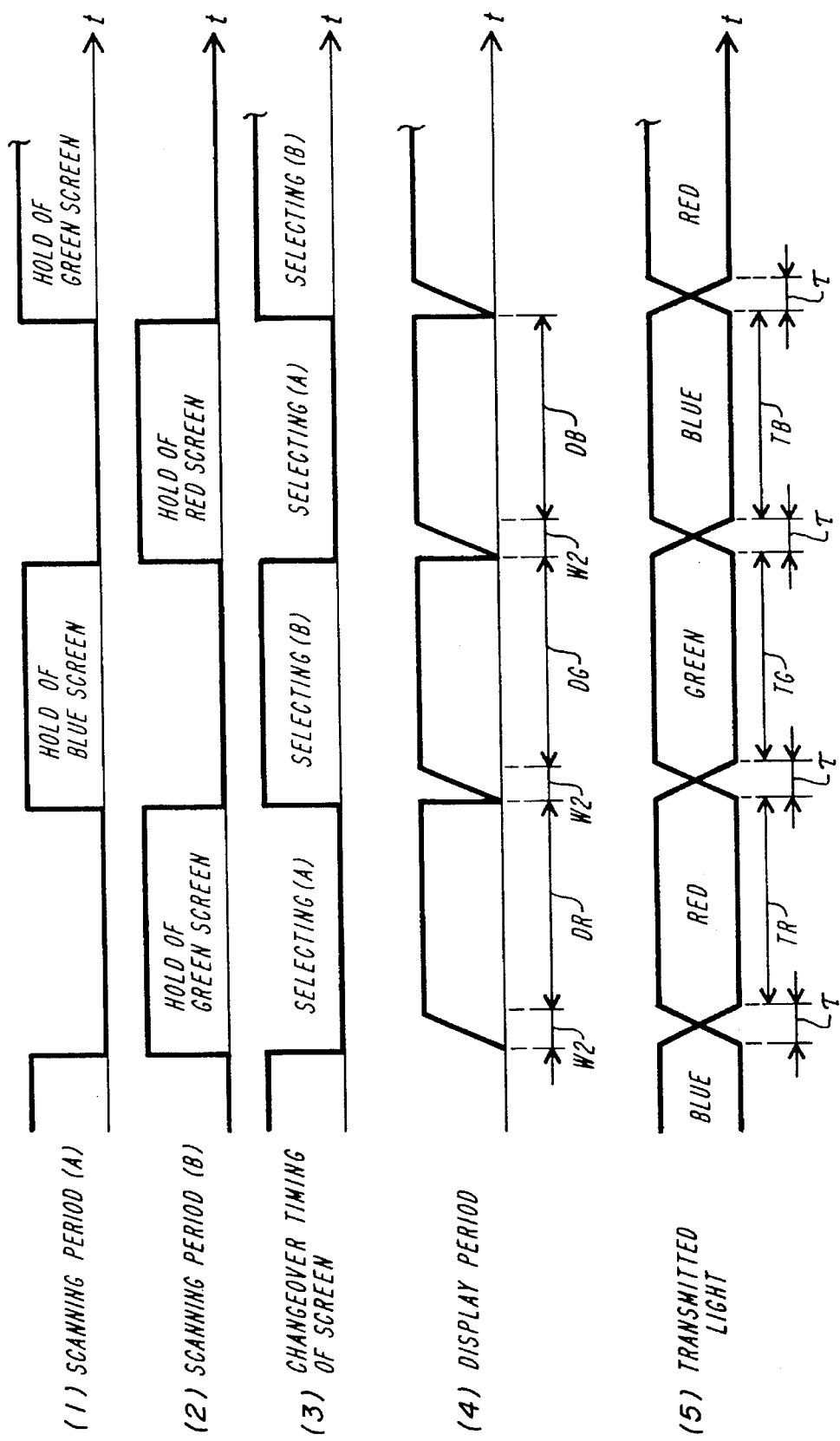
FIG. 6 is a timing chart for explaining a second driving method of the liquid crystal display device 1.

FIG. 5 is a circuit diagram showing the basic composition of a driving circuit 4a used in execution of the second driving method, and FIG. 6 is a timing chart for explaining the second driving method. The driving circuit 4a in FIG. 5 is similar to the driving circuit 4 in FIG. 3, and corresponding parts are identified with the same reference numbers. In the driving circuit 4a, there are two signal holding capacitors 33a, 33b for holding the driving signal from the signal scanning part 32, and it also comprises a switch SW1 for changing over the driving signal from the signal scanning part 32 to the capacitor 33a or 33b, and a switch SW2 for changing over the driving signal held in the capacitor 33a or 33b to the pixel driving part 34.

The second driving method is a method of writing the driving signal of a next screen into the driving circuit 4a while making a specified display by using the driving circuit 4a. Therefore, as compared with the first driving method, since the driving signal is already taken into the driving circuit 4a, high speed scanning is not needed, and therefore the requirement for high speed in the scanning electrode driving circuit and signal electrode driving circuit may be alleviated.

Referring to FIG. 5 and FIG. 6, while each liquid crystal (pixel) 31 is driven by the driving signal information held in the capacitor 33b, the driving signal information to be displayed on the next pixel is held in the capacitor 33a through the signal scanning part 32 and switch Such action is effected on all of N×M pixels, and after taking the driving signal information to be displayed next in each pixel into the liquid crystal display element 2 (driving circuit 4), the switch SW1 corresponding to each pixel is changed over to a terminal a1, and the switch SW2 to a terminal b2 at proper timing. By changeover of the switches SW1, SW2, the display screen of the liquid crystal display element 2 is changed instantly to the next screen. Afterwards, the driving signal information to be displayed next is held in the capacitor 33b, and the driving signal information is taken into the liquid crystal display element 2 (driving circuit 4). Thereafter, the same operation is repeated, and by synchronizing the changeover timing of the screen, that is, the changeover timing of the switches SW1, SW2 with the timing of color change of the light selecting means 3, a color display is realized. In FIG. 6(b), meanwhile, the period W2 corresponds to the response characteristic of the display mode applied to the liquid crystal display element 2, and it should be as short as possible.

Incidentally, in FIG. 2, by properly controlling the application timing of the voltage to the cyan filter 19C, magenta filter 19N, and yellow filter 19Y, mixture of two colors (blue and red, red and green, green and blue) can be avoided, so that the starting timing of the period W1 in FIG. 4 and period W2 in FIG. 6 may be properly designed. Furthermore, in the reflection type liquid crystal display element 2, there is a problem of light reflection on other layers than the light reflecting means, such as on the transparent substrate, transparent electrode interface and various film interface, but by forming anti-reflection films on these positions, it is effective for enhancing the contrast characteristics.

What matters here is the response characteristic of each liquid crystal element. The lower limit of the frequency at which the human eye does not recognize the flicker of display is about 30 Hz, and therefore in the foregoing embodiment the allowable time of display for red, blue and green is about 10 msec. In order to display sufficiently in 10 msec, the light selecting means 3 and the reflection type liquid crystal display element 2 are required to be capable of modulating colors and displaying, at the response speed of not more than several milliseconds.

The present inventor, in consideration of the response characteristics, investigated various liquid crystal display elements, and discovered that the phase transition mode adding dichroic pigment, high molecular dispersion type liquid crystal display mode, display mode using liquid crystal for two frequency drive and ferroelectric liquid crystal display mode are preferred as the liquid crystal display mode, and that the active matrix drive type liquid crystal display element is preferred as the reflection type liquid crystal display element. In particular, in the active matrix drive type liquid crystal display element, the usable materials include the two-terminal type active element such as MIM (Metal Insulator Metal) and diode, thin film transistor (TFT) using a-Si (amorphous Silicon), p-Si (poly-Silicon) or the like, three-terminal type active element such as MOS-FET (Metal Oxide Semiconductor-Field Effect Transistor) using monocrystal silicon or monocrystal GaAs, plasma address type liquid crystal display element (T. S. Buzak: SID 90 DIGEST, p. 420), and light scanning type liquid crystal display element which is composed of a light source for light scanning such as laser or LED (Light Emission Diode), light conductive path, light conductive materials and liquid crystal. In particular, from the viewpoint of mass production of high precision display, the a-Si TFT-LCD. p-Si TFT-LCD, and monocrystal silicon MOS-FET-LCD are preferred. As the display mode, in order to obtain a bright reflection type display, the phase transition mode (White-Taylor mode) adding dichroic pigment without using polarizer, or the (polymer) high molecular dispersion type liquid crystal display mode is preferred.

As the light selecting means 3, a plurality of liquid crystal elements forming transparent electrodes on the entire surface of display are formed, and each liquid crystal element absorbs the light at different wavelength in the visible light region when the voltage is applied or when no voltage is applied.

Such light absorbing function is realized by the so-call guest-hose liquid crystal fabricated by adding a dichroic pigment of anthraquinone, azo, azomethine, styryl, or merocyanine compound to the host liquid crystal.

For example, to obtain the transmitted light of red, green and blue by using the light selecting means 3, pigments of cyan, magenta and yellow are used. For example, the following pigments are generally known.

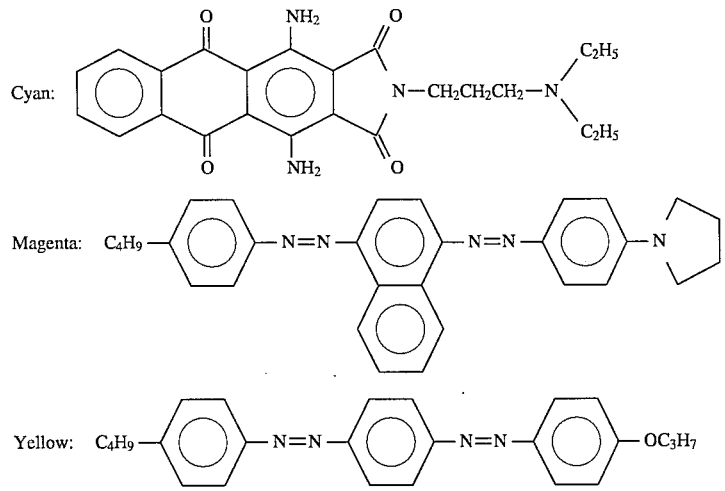

These pigments are properly added to the liquid crystal system or mixed liquid crystal system of biphenyl liquid crystal, phenylcyclohexane liquid crystal, cyclohexyl cyclohexane liquid crystal, phenylester liquid crystal, phenylpyrimidine liquid crystal, phenyldioxane liquid crystal, tolane liquid crystal, fluorine liquid crystal or the like, and by using such three types of guest-host liquid crystal, the cyan filter 19C, magenta filter 19M, and yellow filter 19Y for composing the light selecting means 3 are formed.

Furthermore, in order to meet the requirement for high speed response characteristic as mentioned above, as a result of investigation from the viewpoint of high speed response characteristic, it has been confirmed that the high speed response (not more than several milliseconds) may be achieved by adding chiral nematic liquid crystal to the above guest-host liquid crystal, defining at $d/p \geq 2$ (d: cell thickness, p: intrinsic spiral pitch), and $d \leq 10$ μm, and containing at least phenylcyclohexane liquid crystal or fluorine liquid crystal as the host liquid crystal material.

This host liquid crystal may be used in combination with the substrate orientation whether the dielectric anisotropy ($\Delta\epsilon$) is positive or negative, and it is also effective for obtaining high speed response to use the material becoming positive at low frequency and negative at high frequency depending on the driving frequency (liquid crystal for two-frequency drive).

As other methods of realizing, the high speed response may be easily realized by enclosing in microcapsules the guest-host material or using the guest-host material to which chiral nematic liquid crystal is added, and dispersing in high molecular material, or by dispersing directly in the mesh-structure high molecular matrix to composed the high molecular dispersion type liquid crystal, or impregnating the liquid crystal to the mass of ultrafine fiber operating similarly.

It is also possible to realize by using ferroelectric liquid crystal, but in this case since the polarizer is needed, it must be considered that the brightness of the display is sacrificed. In this embodiment, the light selecting means 3 of three layer laminate type is used, but it is not limitative, and the type of pigments and number of laminates may be designed depending on the desired display color.

The active matrix substrate for composing the reflection type liquid crystal display element 2 requires high speed scanning. In this regard, as active element, the MOS-FET using monocrystal silicon substrate having a large mobility, and p-Si TFT (reflection type structure) are preferred. In the liquid crystal display element of a smaller number of scanning electrodes, the a-Si TFT (reflection type structure) advantageous in mass producibility and larger size is also usable.

Meanwhile, in the monocrystal silicon MOS-FET or p-Si TFT, since the liquid crystal driving circuit may be formed as a unit on the circumference, and it is easy to control the N channel, P channel, the resistance is extremely low, and even the liquid crystal not realized by parallel addition of capacitors for holding electric charge may be realized by forming a switching element for pixel in the CMOS structure as shown in FIG. 3. In FIG. 3, the signal scanning part 32 is composed of N-channel MOS transistor, but it may be also formed by using F-channel MOS transistor.

Furthermore, in the monocrystal silicon MOS FET, since the mobility (mobility $\mu=500$ cm$^2$/V S) is extremely large as compared with that of p-Si or a-Si, scanning at very high speed is possible, and the display capacity may be increased, and also by applying the conventional semiconductor technology, the memory circuit or operation circuit may be built in the liquid crystal display element so as to be intelligent, and also by forming a switching element for pixel on the peripheral driving circuit, the peripheral driving circuit mounting region may be omitted, and the display may be reduced in size, and moreover by gluing a plurality of liquid crystal panels on a board (for example, a quartz board), the display area may be increased in size, and many other advantages are brought about.

As the display mode of such reflection type active matrix liquid crystal display element, the phase transition mode of adding dichroic pigment as mentioned above and high molecular dispersion type liquid crystal are applicable, and in this case the dichroic pigment must be prepared to be black.

Figure 7:
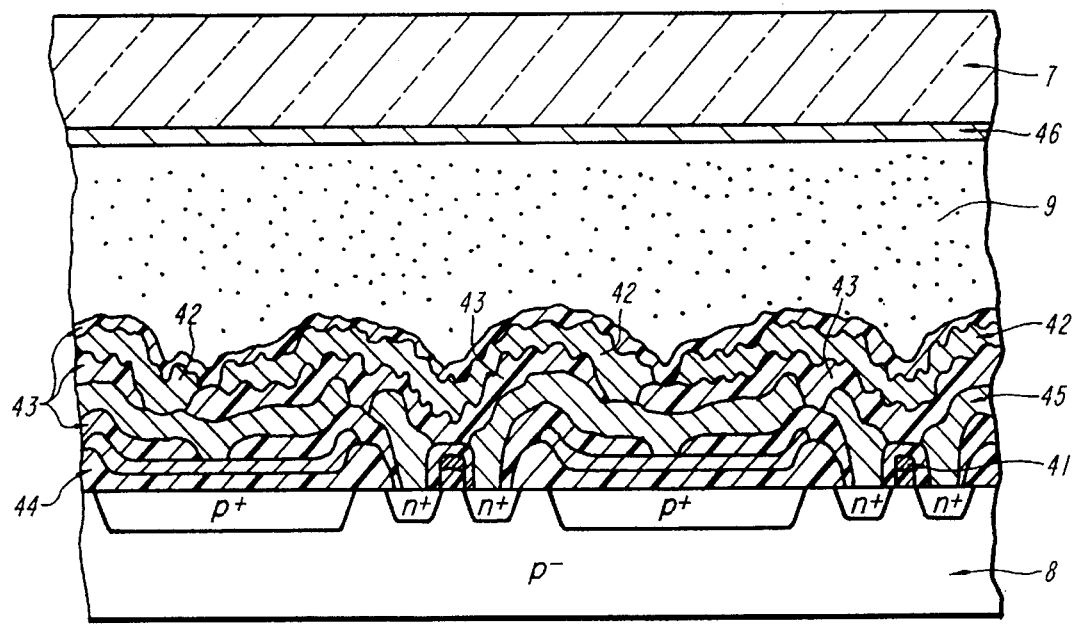
FIG. 7 is a sectional view showing the element structure of a reflection type liquid crystal display element 2 used in the liquid crystal display device 1.

FIG. 7 is a sectional view showing an element structure in which the reflection type liquid crystal display element 2 is formed as a silicon monocrystal active substrate. The fabrication process is the MOS semiconductor process technology.

In the period from writing to next writing, as the means for supporting the holding o f electric charge injected in the pixels, a storage capacitor is formed between the silicon substrate 8 insulated with a film and a p-Si 41.

The pixel electrode 42 which is also a reflection film is aluminum (Al), and its asperities are formed by applying a photoresist on an insulation layer (SiN$_x$) 43 beneath the aluminum, and processing the surface by photolithography.

The liquid crystal 9 is a black guest-host liquid crystal ZLI-2327 manufactured by Merck, and by adding a trace of Merck-made CB-15, d/p is adjusted to 4 (d: cell thickness, p: spiral pitch). To adjust the substrate interval, a spacer of 8 μm was used, and the substrate orientation was processed by vertical orientation of polyimide. The number of pixels was 240×380.

In FIG. 7, numeral 44 denotes a field oxide film, 45 is a source line, and 46 denotes a common electrode.

On the other hand, as the filters 19C, 19M, 19Y, the host liquid crystal was prepared by using Merck-made ZLI-1840, and adding 2 wt. % of G209, G232 made by Nippon Kanko Shikiso K.K., and D35 made by BDH, and also adding CB-15 as chiral material to form a three-layer laminate filter. At this time, d/p was about 5, and the substrate orientation was processed by vertical orientation of polyimide. This filter was laid over the liquid crystal display element shown in FIG. 7, and when it was driven at the timing shown in FIG. 4, a favorable color display was confirmed.

In the liquid crystal display element structure shown in FIG. 7, high molecular dispersion type liquid crystal was used as the liquid crystal. In a solution of 2-ethylhexylacrylate (monomer): urethane acrylate oligomer: ZLI-2327= 16:24:60, a photopolymerization initiator was uniformly mixed, and the mixed solution was sealed in the liquid crystal elements in the reflection type active matrix substrate, and it was irradiated with ultraviolet (UV) rays.

On the other hand, using the above pigments and host liquid crystal (ZLI-1840), by mixing with the solution outside the liquid crystal in the same manner at the same ratio, three layers of liquid crystal elements (filters) were prepared. When these liquid crystal display elements and filters were laminated, a favorable color operation characteristic was confirmed.

Furthermore, in the liquid crystal element structure in FIG. 7, by controlling the P channel and N channel so that the reflection type active matrix substrate may be an equivalent circuit as the circuit shown in FIG. 3, a CMOS structure was realized. In this case, too, a favorable color display characteristic was confirmed.

Figure 8:
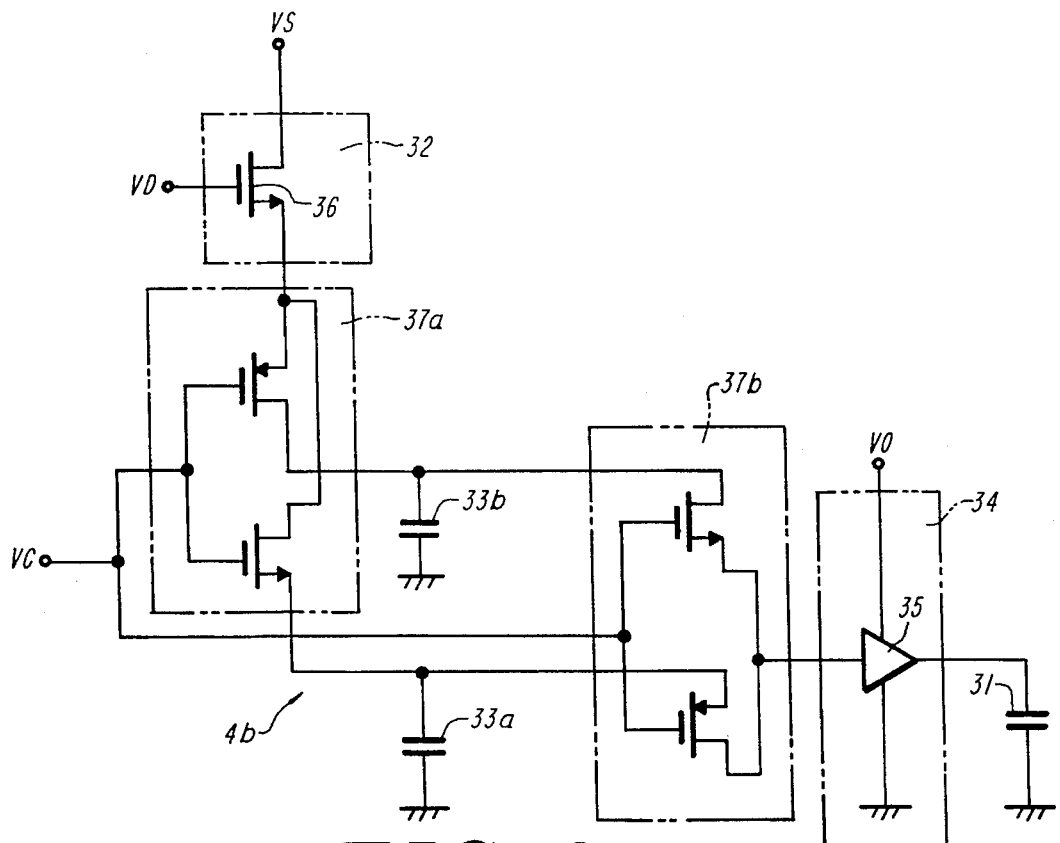
FIG. 8 is a circuit diagram showing the composition of a further different driving circuit 4b used in the liquid crystal display device 1.

FIG. 8 is a circuit diagram showing a further different composition of the driving circuit 4b. The driving circuit 4b in FIG. 8 is similar to the driving circuit 4b in FIG. 5, and the corresponding parts are identified with the same reference numbers.

In the driving circuit 4b, instead of the switches SW1, SW2 used in the driving circuit 4a, switching circuits 37a, 37b are disposed. By applying a signal of high level or low level to the terminal VC, the driving circuit 4b can drive the liquid crystal 31 by the driving signal held in the capacitor 33a or 33b. Therefore, while displaying the screen of the liquid crystal display element 2, the driving signal to be displayed next can be held at the same time, so that the driving method shown in FIG. 6 may be realized.

Thus, according to the embodiment, since various display colors can be expressed by one pixel, as compared with the conventional color display by using microcolor filter, the resolution is enhanced, and the background light source (backlight) is not needed, and thin and lightweight color liquid crystal display is realized. It is therefore extremely effective for various information related appliances, such as notebook type personal computer, palmtop type personal computer, and game machines.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflection type liquid crystal display device having a display mode, said device comprising:

an active matrix liquid crystal display element having a transparent substrate, a second substrate having light reflecting means for reflecting the incident light coming from a transparent substrate side, electrodes formed on confronting surfaces of said substrates, and an interposing liquid crystal composition between the transparent substrate and the second substrate, pixels defined by overlapping regions of the electrodes, each pixel having a respective driving circuit corresponding to pixels individually and including a respective first signal holding capacitor connected to a picture element capacitor through a buffer circuit, a voltage supply line for driving a respective pixel being different from a voltage supply line to the respective first signal holding capacitor;

means for holding driving signal information to be displayed on the pixel in a next time frame While display is performed in a current time frame.

2. A liquid crystal display device of claim 1, wherein the color selecting means comprises multiple layers, each layer permitting a different wavelength of light to pass through, each layer being coextensive with said liquid crystal display element.

3. The liquid crystal display device or claim 2, wherein one or more of said transparent substrates have an anti-reflective film thereon.

4. A liquid crystal display device of claim 1, wherein the color selecting means comprises:

a cyan filter having a pair of transparent substrates, transparent electrodes extending nearly over the entire area of the confronting surface of said pair of transparent substrates, and an interposing liquid crystal composition containing dichroic pigment of cyan between the pair of transparent substrates, a magenta filter having a pair of transparent substrates, transparent electrodes extending nearly over the entire area of the confronting surface of said pair of transparent substrates, and an interposing liquid crystal composition containing dichroic pigment of magenta between the pair of transparent substrates, a yellow filter having a pair of transparent substrates, transparent electrodes extending nearly over the entire area of the confronting surface of said pair of transparent substrates, and an interposing liquid crystal composition containing dichroic pigment of yellow between the pair of transparent substrates, and filter driving means for applying a voltage selectively to the transparent electrodes of the cyan filter, the magenta filter and the yellow filter.

5. A liquid crystal display device of claim 4, wherein the filter driving means (i) sequentially drives the cyan filter, magenta filter and yellow filter in every predetermined unit time, thereby providing a red display period in which the incident light to the liquid crystal display element is red, a green display period in which it is green, and a blue display period in which it is blue, and (ii) sets the unit display period as the sum of the red display period, green display period and blue display period.

6. A liquid crystal display device of claim 5, further comprising the respective driving circuits controlling a quantity of reflected light in each pixel in each display period comprising a unit display period.

7. A liquid crystal display device of claim 6, wherein the quantity of reflected light in each pixel is either at 0 or at a predetermined value.

8. A liquid crystal display device of claim 6 wherein the quantity of reflected light in each pixel is changed continuously or stepwise between 0 and a predetermined value.

9. The liquid crystal display device of claim 4, wherein one or more of said transparent substrates have an anti-reflective film thereon.

10. A liquid crystal display device of claim 1, 2, 4, 5, 6, 7 or 8, wherein the liquid crystal display element is an active matrix type liquid crystal display element having one common electrode over substantially the entire surface of the transparent substrate, and having plural display electrodes for forming pixels on the confronting side of the second substrate.

11. A liquid crystal display device of claim 10, wherein the driving circuits are controlled by display control means for producing a scanning signal for specifying the plural display electrodes individually, and a driving signal for applying a voltage to each display electrode.

12. A liquid crystal display device of claim 11, wherein the respective driving circuits include:

a signal scanning part controlled by the scanning signal for producing the driving signal in an On state, said buffer circuit applying a voltage to a display electrode according to the driving signal from the signal scanning part, and said first signal holding capacitor disposed between the signal scanning part and buffer circuit for holding the potential of the driving signal from the signal scanning part.

13. A liquid crystal display device of claim 11, wherein the respective driving circuits include:

a signal scanning part controlled by the scanning signal for producing the driving signal in an On state, said buffer circuit applying a voltage to the display electrode according to the driving signal from the signal scanning part, said means for holding driving signal information being a second signal holding capacitor disposed between the signal scanning part and buffer circuit for holding the potential of the driving signal from the signal scanning part, and connection changeover means for connecting the second signal holding capacitor to the buffer circuit when connecting the first signal holding capacitor to the signal scanning part, and connecting the first signal holding capacitor to the buffer circuit when connecting the second signal holding capacitor to the signal scanning port.

14. The liquid crystal display device of claim 10, wherein the active matrix liquid crystal display element comprises a substrate containing amorphous silicon, polycrystalline silicon or monocrystalline silicon.

15. A liquid crystal display device of claim 1, wherein the display mode is a phase transition mode or a high molecular dispersion type liquid crystal mode.

16. The liquid crystal display device of claim 1, further comprising an anti-reflective film on said transparent substrate.

17. The liquid crystal display device of claim 1, having a cell thickness d and an intrinsic spiral pitch p wherein $d/p \geq 2$ and $d \leq 10$ μm.

18. The liquid crystal display device of claim 1, wherein the liquid crystal material comprises a structure made of phenylcyclohexane liquid crystal or fluorinated liquid crystal.

19. The liquid crystal display device of claim 1, wherein the active matrix liquid crystal display element comprises an active matrix substrate comprising a polysilicon material or a monocrystalline silicon material as an active element material.

20. The liquid crystal display device of claim 19, wherein the liquid crystal composition comprises a liquid crystal material for a two frequency driving mode, a liquid crystal material for a high molecular dispersion type liquid crystal display mode, or a liquid crystal material comprising a dichroic pigment in a display element having a cell thickness d and an intrinsic spiral pitch p wherein $d/p \geq 2$ and $d \leq 10$ μm for a phase transition display mode.

21. The device of claim 1 further including color selecting means disposed at the transparent substrate side of the liquid crystal display element for varying the wavelength of the incident light to the liquid crystal display element in every predetermined unit time.

22. The device of claim 1 wherein the liquid crystal composition comprises a chiral nematic liquid crystal material, a liquid crystal material for a two frequency driving mode, a liquid crystal material for a high molecular dispersion type liquid crystal display mode, a liquid crystal material for a ferroelectric liquid crystal display mode, or a liquid crystal material for a phase transition display mode.

* * * * *